United States Patent [19]

Nishikawa et al.

[11] Patent Number: 5,138,131
[45] Date of Patent: Aug. 11, 1992

[54] LASER CUTTING METHOD AND APPARATUS FOR EFFECTING SAID METHOD

[75] Inventors: Yukio Nishikawa, Ikeda; Yuji Uesugi, Osaka; Katsuhiro Kuriyama, Takarazuka; Tadao Shioyama, Sakurai, all of Japan

[73] Assignee: Matsushita Electric Industrial Co., Ltd., Osaka, Japan

[21] Appl. No.: 665,215

[22] Filed: Mar. 5, 1991

[30] Foreign Application Priority Data

Mar. 7, 1990 [JP] Japan .................................. 2-55324

[51] Int. Cl.$^5$ .............................................. B23K 26/00
[52] U.S. Cl. ................................ 219/121.67; 65/174; 219/121.72
[58] Field of Search ............ 219/121.67, 121.72, 219/121.76; 65/174, 176

[56] References Cited

U.S. PATENT DOCUMENTS 4,343,993  8/1982  Binnig et al. .................... 250/306

OTHER PUBLICATIONS

"Atomic Force Microscope-Force Mapping and Profitting on a Sub 100-A Scale", by Y. Martin et al., J. Appl. Phys. 61(10), May 15, 1987, pp. 4723, 2724, 2726, 2728.

Primary Examiner—C. L. Albritton
Attorney, Agent, or Firm—Wenderoth, Lind & Ponack

[57] ABSTRACT

A laser cutting method for a glass material, includes steps of forming a continuous scribing line at least on one side face of the glass material, and projecting a laser beam onto the scribing line. A laser cutting apparatus for effecting the laser cutting method, includes a laser oscillating source for emitting the laser beam, a light condensing device for condensing the laser beam onto a surface of the glass material, a scribing device for forming the scribing line on the surface of the glass material, and a displacing device for displacing the laser beam on the scribing line following movement of the scribing point.

1 Claim, 3 Drawing Sheets

Curves { —o— BK7
—— Synthetic quartz
------ Molten quartz

LASER CUTTING METHOD AND APPARATUS FOR EFFECTING SAID METHOD

BACKGROUND OF THE INVENTION

The present invention generally relates to a cutting arrangement and more particularly, to a method of cutting a glass material by the use of a laser beam, and an apparatus for effecting said cutting method.

Referring to FIG. 5 showing a known laser cutting apparatus for a glass material, a conventional laser cutting method of a glass material and an apparatus employed therefor will be described hereinafter.

The conventional laser cutting apparatus of a glass material shown in FIG. 5 includes a laser oscillator LO for generating a laser beam LB, a reflecting mirror M for directing the laser beam LB onto a glass plate GP to be cut along a line L through a condenser lens CL, and an X-Y table TB for supporting the glass plate GP.

In the conventional arrangement as described above, the laser beam LB emitted from the laser oscillator LO is converged onto the glass substrate GP by the condenser lens CL, and the glass substrate GP is simultaneously moved by the X-Y table TB. In the case where a carbonic acid gas laser is employed for the laser oscillator LO, since the glass material has a high absorption rate with respect to the wavelength 10.6 $\mu$m of said laser beam, the portion of the glass substrate GP subjected to the irradiation of the laser beam LB is fused to be cut. Meanwhile, when a YAG laser is employed for the laser oscillator LO, although the absorption rate of the glass material with respect to the wavelength 1.06 $\mu$m of said laser beam is generally low, it is reported by Kurobe et al. that soda-lime glass may be cut off (according to a collection of papers at the scientific lecture meeting for the spring general conference of Precision Engineering Association, 1988, page 853).

However, in the conventional glass cutting method employing a carbonic acid gas laser as described above, the glass material absorbs the laser beam so as to be fused and cut by heating. Therefore, since a predetermined cutting width is required, with sagging or run of the glass material, or a portion affected by heat being produced around the cut portion, sufficient processing accuracy can not be achieved. Another problem with this process is that a crack may occur in the vicinity of the cut portion due to remaining thermal stress.

Meanwhile, in the practice which employs the YAG laser, due to the fact that the laser absorption rate of glass is generally low, energy efficiency is undesirably deteriorated, with glass materials which can be cut being limited. Furthermore, in the case where another layer, such as a vapor deposition layer, is present on the reverse surface of the glass material, as in a glass substrate for liquid crystal, such vapor deposition layer may be undesirably processed by the laser beam transmitted through the glass substrate.

SUMMARY OF THE INVENTION

Accordingly, an essential object of the present invention is to provide a laser cutting method for cutting a glass material, which is capable of cutting the glass material into a desired shape at high accuracy, without requiring a specific cutting width, and for which it is unnecessary to provide additional processing even when another layer is present on the reverse surface, as in a glass substrate for a liquid crystal.

Another object of the present invention is to provide a laser cutting apparatus for a glass material which is capable of effecting the above laser cutting method in an efficient manner.

In accomplishing these and other objects, according to one preferred embodiment of the present invention, there is provided a laser cutting method for a glass material, which includes steps of forming a continuous scribing line at least on one side face of the glass material, and projecting a laser beam onto the scribing line, to thereby to cut the glass material. For effecting the scribing and laser cutting with a single unit, the laser cutting apparatus according to the present invention is provided with the scribing device, light condensing device, and displacing device so that the laser beam is displaced along the scribing line, following movement of the scribing point.

By the above arrangement according to the present invention, the laser beam is entirely absorbed by the glass material in the vicinity of the irradiated portion, to thereby locally raise the temperature, with a consequent increase of elastic strain energy resulting from a temperature gradient. As a result, a crack having the scribing line as a generating point is produced in a direction of thickness, with the crack propagating as the laser beam is displaced, thereby making it possible to cut the glass material with high accuracy. Meanwhile, as shown in FIGS. 6(a) and 6(b) representing variations in transmittance of glass materials by wavelengths, BK7 (alkali glass) reaches 0% in transmittance at a wavelength above 2.9 $\mu$m and quartz also reaches 0% in transmittance at a wavelength above 4.3 $\mu$m. Therefore, by selecting a laser oscillator having a wavelength above 4 $\mu$m, it becomes possible to avoid unnecessary processing in the case where another layer is present on a reverse face of the glass material, as in a glass substrate for a liquid crystal.

BRIEF DESCRIPTION OF THE DRAWINGS

These and other objects and features of the present invention will become apparent from the following descriptions of the preferred embodiments thereof with reference to the accompanying drawings, in which.

DETAILED DESCRIPTION OF THE INVENTION

Figure 1:
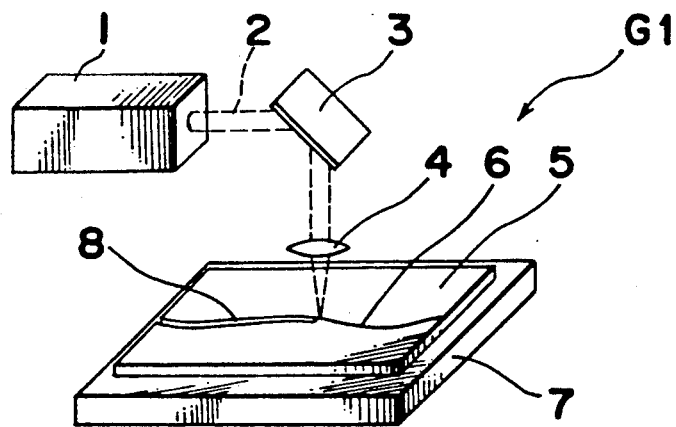
FIG. 1 is a perspective view showing a general construction of a laser cutting apparatus for a glass material according to a first embodiment of the present invention.

Before the description of the present invention proceeds, it is to be noted that like parts are designated by like reference numerals throughout the accompanying drawings.

Referring now to the drawings, there is shown in FIG. 1, a laser cutting apparatus G1 for a glass material according to one preferred embodiment for use in explaining a laser cutting method of the present invention.

In FIG. 1, the laser cutting apparatus G1 generally includes a carbonic acid gas laser oscillator 1 of a continuous oscillation type for emitting a laser beam 2, a reflecting mirror 3 for directing the laser beam 2 onto a glass substrate 5 for a liquid crystal (made of non-alkali glass) to be cut along a scribing line 6, such as shown by a cut line 8, through a condenser lens 4, and an X-Y table 7 on which the glass substrate 5 is placed.

In the above arrangement, laser beam 2 emitted from the carbonic acid gas laser oscillator 1 is incident upon the condenser lens 4 through the reflecting mirror 3 so as to be projected onto the glass substrate 5.

By displacing the X-Y table so as to bring the laser spot onto the scribing line 6 formed on the surface of the glass substrate, with its face formed with a thin film being directed downwards, the glass substrate 5 can be cut into the specific shape. In the case of the glass plate 5 having a thickness of 1 mm, when a power density at the processing point is set in a range of 25 to 50 w/cm$^2$, a cutting speed of 10 mm/sec. could be obtained. Although the cutting line 8 proceeds through displacement of the laser spot, since the cutting mechanism is attributable to the elastic strain following a local temperature rise, propagation of the crack takes place at a position after the laser irradiating position. Therefore, there is no possibility that the laser beam 2 is directly projected onto the thin film at the reverse surface, and thus, such thin film is not subjected to unnecessary processing. For the formation of the scribing line, a process employing a mechanical means such as a diamond cutter or the like seemed preferable, with a tendency to facilitate the generation of the crack being due to the effect of the residual strain. Meanwhile, with respect to the direction for projecting the laser beam, there was noticed a tendency that the crack formation was facilitated more by the projection of the laser beam onto the scribing line than by the projection thereof from the reverse surface of the glass plate.

Figure 2:
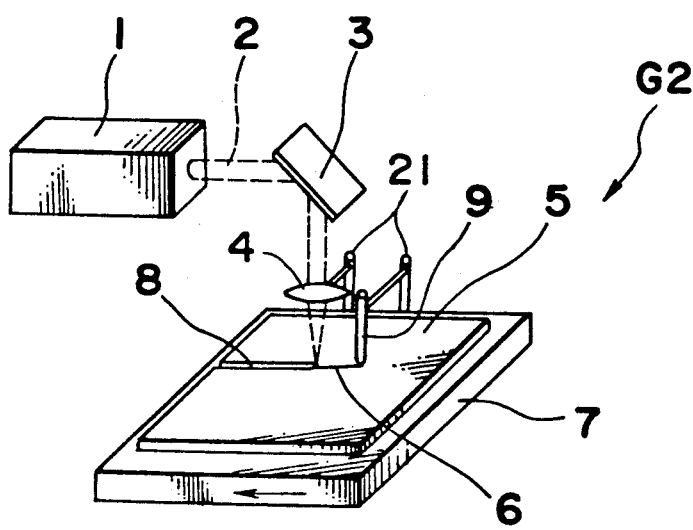
FIG. 2 is a view similar to FIG. 1, but showing a laser cutting apparatus for a glass material according to a second embodiment of the present invention.

Referring to FIG. 2, there is shown a laser cutting apparatus G2 of a glass material according to a second embodiment of the present invention.

In the laser cutting apparatus G2 in FIG. 2, a diamond cutter member 9 is further provided so as to be supported by a support mechanism 21 in a position prior to the laser beam processing point as shown.

Since other construction of the laser cutting apparatus G2 in FIG. 2 is generally similar to that in the laser cutting apparatus G1 in FIG. 1, detailed description thereof is abbreviated here for brevity with like parts being designated by like reference numerals.

In the laser cutting apparatus G2 as referred to above, when the X-Y table 7 is moved in the direction of an arrow in FIG. 2 so that the laser processing point follows the scribing point by the diamond cutter member 9, the scribing line 6 is formed by the diamond cutter member 9, such that the laser beam 2 projected onto the scribing line 6 forms the straight cutting line 8.

As described above, by moving the glass substrate 5 so that the laser processing point follows the scribing point, the scribing and laser cutting may be effected by a single process.

Figure 3:
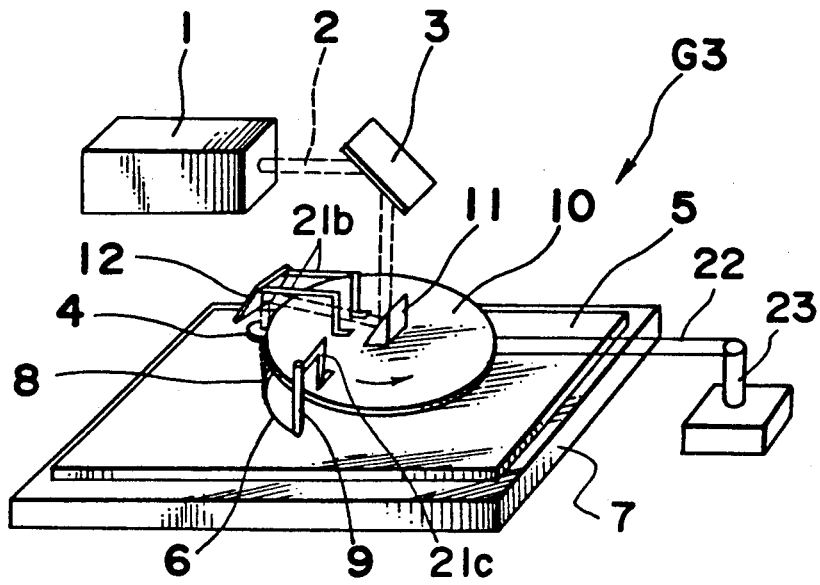
FIG. 3 is a view similar to FIG. 1, but showing a laser cutting apparatus for a glass material according to a third embodiment of the present invention.

Referring further to FIG. 3, there is shown a laser cutting apparatus G3 according to a third embodiment of the present invention.

In the laser cutting apparatus G3 in FIG. 3, between the reflecting mirror 3 and the condenser lens 4, there are further provided a rotary mechanism 10 to be driven by a driving mechanism 23 through a belt 22, a reflecting mirror 11 disposed at a central portion of the rotary mechanism 10, and another reflecting mirror 12 supported by a driving mechanism 21b and provided at an outer peripheral portion of the rotary mechanism 10 immediately before the condenser lens 4. A diamond cutter member 9 is supported by a support member 21c disposed in a position prior to the laser processing point.

In the arrangement of FIG. 3, the laser beam 2 emitted from the carbonic acid gas laser oscillator 1 is incident upon the reflecting mirror 11 disposed at the central portion of the rotary mechanism 10 by the reflecting mirror 3, and is further directed into the condenser lens 4 through the reflecting mirror 12 provided at the outer peripheral portion of the rotary mechanism 10 so as to be projected onto the glass substrate 5. Owing to the arrangement that distances from the rotational center to the scribing point, and to the laser processing point, are equal to each other, with the diamond cutter member 9 being provided in the position before the laser processing point with respect to the rotating direction indicated by an arrow in FIG. 3, it becomes possible to the project laser beam onto the scribing line 6. Thus, an arcuate cutting line 8 may be formed on the glass substrate 5 by rotating the rotary mechanism 10 with the driving mechanism 23 through the belt 22.

Since other construction of the laser cutting apparatus G3 in FIG. 3 is generally similar to that in the laser cutting apparatus G1 in FIG. 1, a detailed description thereof is abbreviated here for brevity with like parts being designated by like reference numerals.

Figure 4:
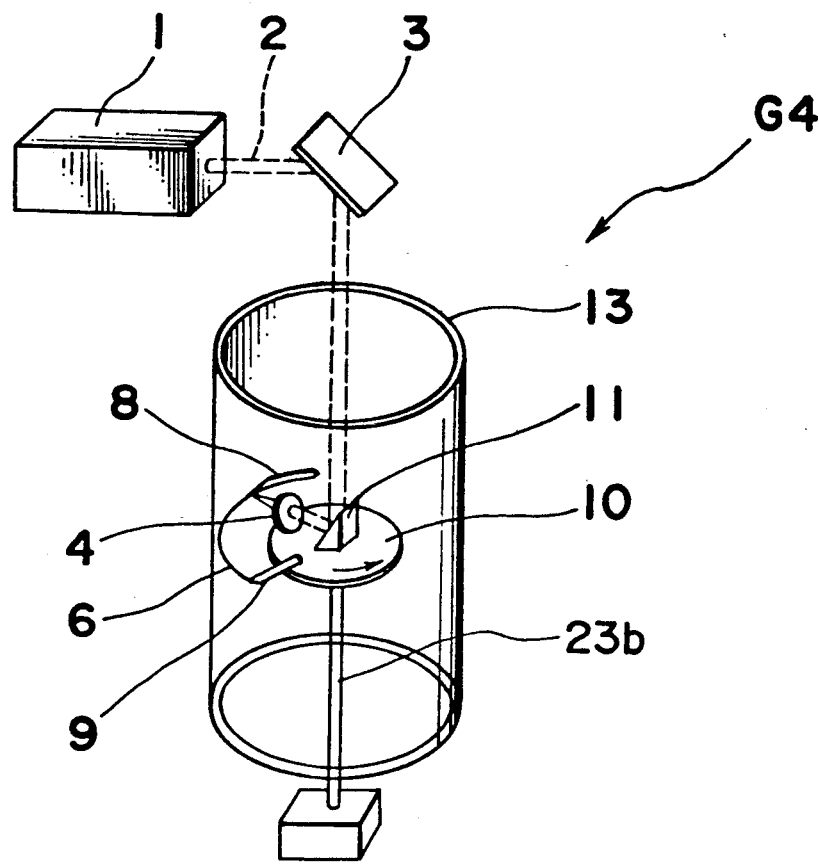
FIG. 4 is a view similar to FIG. 1, but showing a laser cutting apparatus of a glass material according to a fourth embodiment of the present invention.
Figure 5:
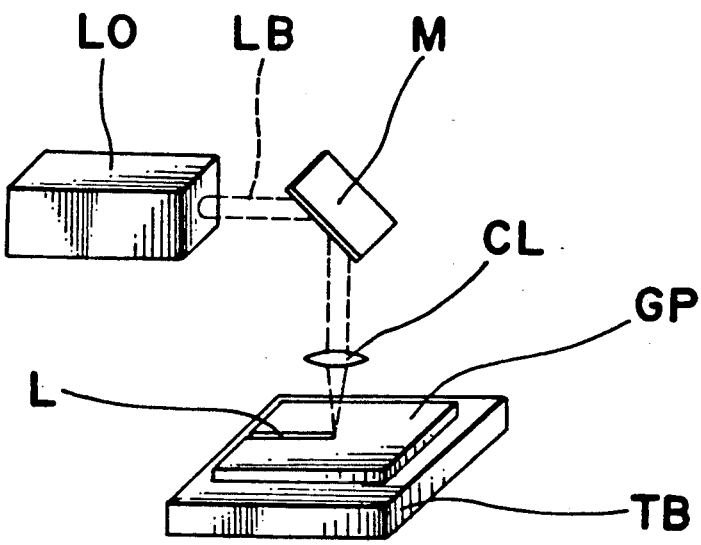
FIG. 5 is a perspective view showing a general construction of a conventional laser cutting apparatus.
Figure 6A:
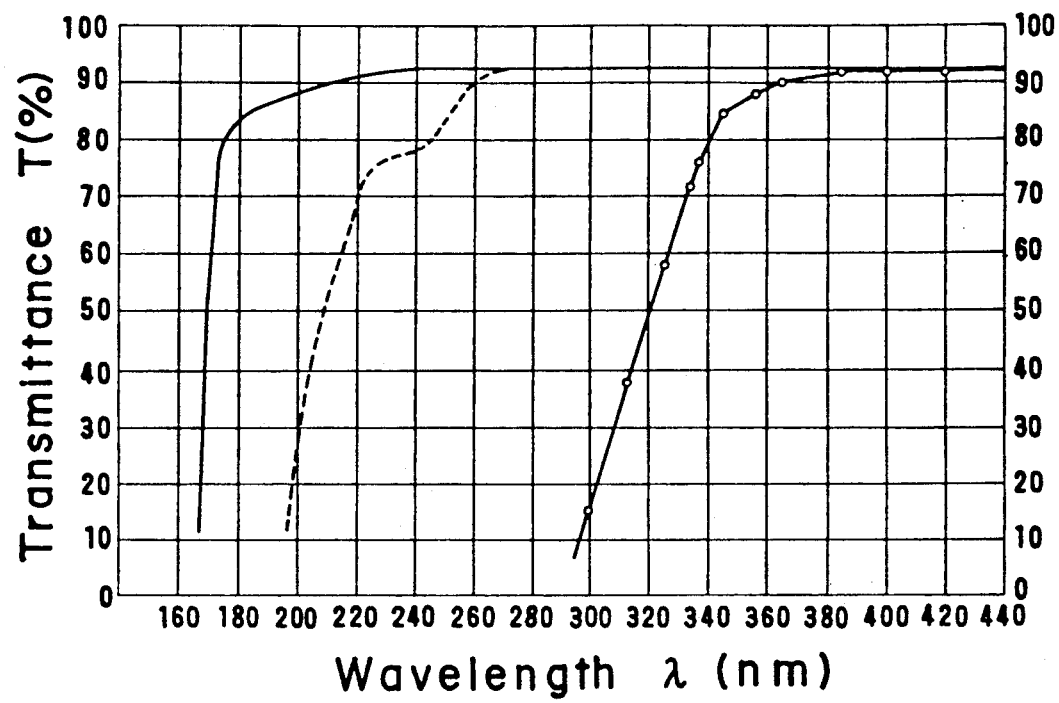
FIGS. 6(a) and 6(b) are graphical diagrams each representing variations of transmittance for glass materials by wavelengths.
Figure 6B:
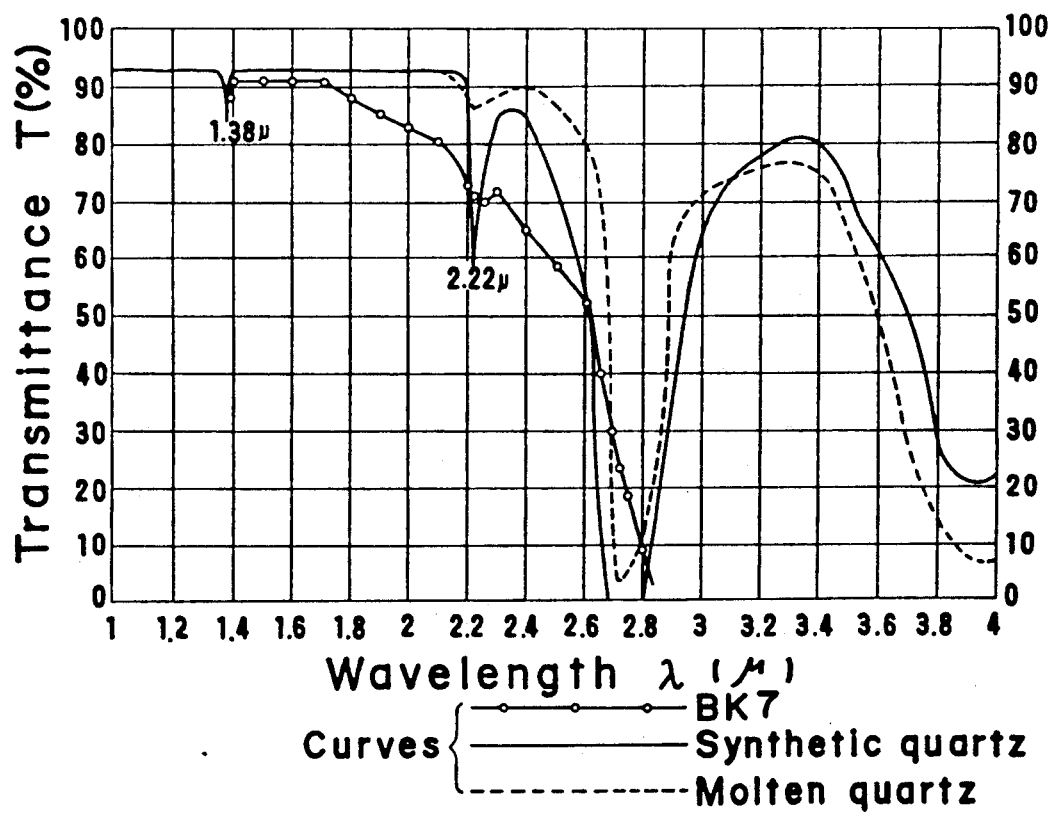

Referring further to FIG. 4, there is shown a laser cutting apparatus G4 according to a fourth embodiment of the present invention.

The laser cutting apparatus G4 in FIG. 4 is intended to cut off a cylindrical glass tube 13. The laser beam 2 emitted from the laser oscillator 1 is reflected by the reflecting mirror 3 onto the reflecting mirror 11. The mirror 11 is disposed at the central portion of the rotary mechanism 10, and is to be driven by a driving mechanism 23b so as to be focused on the inner surface of the glass tube 13 through the condenser lens 4. The laser cutting apparatus G4 of FIG. 4 differs from the apparatus G3 in FIG. 3 in that the condenser lens 4 and the diamond cutter member 9 are arranged on the rotary mechanism 10 so that loci drawn by the scribing point and the laser processing point are directed parallel with respect to the rotating face. With this arrangement. it becomes possible to cut the glass tube from its inner face upon rotation of the driving mechanism 23b.

As is clear from the foregoing description, the present invention arranged so as to form a continuous scribing line at least on one side face of a glass material, to thereby cut off the glass material by projecting the laser beam onto the scribing line. Since the scribing and the laser cutting are effected by one unit of the apparatus, by providing the scribing device, light condensing device and displacing device so that the laser beam is moved on the scribing line following the movement of the scribing point, it is possible to cut the glass material into any desired shape with high accuracy without requiring a cutting width. Even when another layer is present on the reverse face, the glass material may be cut without unnecessary processing to provide a favorable cross section at the cut portion.

Although the present invention has been fully described by way of example with reference to the accompanying drawings, it is to be noted here that various changes and modifications will be apparent to those skilled in the art. Therefore, unless such changes and modifications otherwise depart from the scope of the present invention, they should be construed as included therein.

What is claimed is:

1. A laser cutting apparatus for cutting a glass material, comprising a laser oscillating source for emitting a laser beam, a light condensing device for condensing the laser beam onto a surface of the glass material, a scribing device for forming a scribing line on the surface of the glass material, a displacing device for displacing the laser beam along the scribing line following movement of the scribing point, and a rotary mechanism on which said scribing device and said light condensing device are mounted at equal distances from a rotational center of said rotary mechanism.

* * * * *